US011805092B2

(12) United States Patent
Carter et al.

(10) Patent No.: US 11,805,092 B2
(45) Date of Patent: *Oct. 31, 2023

(54) METHOD AND SYSTEM FOR MAP-T BORDER RELAY DATA PLANE VERIFICATION

(71) Applicant: Charter Communications Operating, LLC, St. Louis, MO (US)

(72) Inventors: Thomas Nathan Carter, Colorado Springs, CO (US); Jeffrey Larkin Cook, Aurora, CO (US); Thomas Lawrence Bowlby, Morrison, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/068,772

(22) Filed: Dec. 20, 2022

(65) Prior Publication Data

US 2023/0124034 A1 Apr. 20, 2023

Related U.S. Application Data

(63) Continuation of application No. 16/986,450, filed on Aug. 6, 2020, now Pat. No. 11,570,137.

(51) Int. Cl.
*H04L 61/251* (2022.01)
*H04L 43/0852* (2022.01)
*H04L 43/065* (2022.01)
*H04L 61/2557* (2022.01)
*H04L 61/2521* (2022.01)

(52) U.S. Cl.
CPC .......... *H04L 61/251* (2013.01); *H04L 43/065* (2013.01); *H04L 43/0852* (2013.01); *H04L 61/2528* (2013.01); *H04L 61/2557* (2013.01)

(58) Field of Classification Search
None
See application file for complete search history.

(56) References Cited

U.S. PATENT DOCUMENTS

| 7,028,335 | B1 | 4/2006 | Borella et al. |
| 9,774,530 | B2 | 9/2017 | Berg |
| 2007/0136495 | A1 | 6/2007 | Boucher et al. |
| 2013/0301650 | A1 | 11/2013 | Zou et al. |
| 2013/0343387 | A1 | 12/2013 | Stroud et al. |
| 2016/0050131 | A1 | 2/2016 | Zhang et al. |

*Primary Examiner* — Brian Whipple
(74) *Attorney, Agent, or Firm* — Young Basile Hanlon & MacFarlane, P.C.

(57) ABSTRACT

Methods and systems for performing a Mapping of Address and Port using translation (MAP-T) data plane verification. A method for performing a MAP-T data plane verification includes initiating, by a diagnostic server provisioned with at least MAP-T diagnostic rules, a MAP-T diagnostic on a border relay provisioned with MAP-T rules, generating, by the diagnostic server, a diagnostic packet per the MAP-T diagnostic rules, sending, by the diagnostic server, the diagnostic packet to the border relay, performing, by the border relay, a translation on the diagnostic packet per the provisioned MAP-T rules, analyzing, by the diagnostic server to generate a report, at least a translation accuracy of a received translated diagnostic packet, and configuring at least one device based on a received report.

20 Claims, 6 Drawing Sheets

METHOD AND SYSTEM FOR MAP-T BORDER RELAY DATA PLANE VERIFICATION

CROSS REFERENCE TO RELATED APPLICATION

This application is a continuation of U.S. patent application Ser. No. 16/986,450, filed on Aug. 6, 2020, of which is incorporated herein by reference.

TECHNICAL FIELD

This disclosure relates to network devices employed to transfer packets between Internet Protocol Version 4 (IPv4) and Internet Protocol Version 6 (IPv6) domains. More specifically, this disclosure relates to verification of Mapping of Address and Port using translation (MAP-T) data plane functionality provisioned on the network devices, which can be border relays or routers, for example.

BACKGROUND

Networking and internetworking communication protocols are relied upon to carry data through the networks. The Internet Protocol (IP) is the principal communications protocol in the Internet protocol suite for relaying and routing packets across the networks from a source to a destination. It describes the format of packets, the addressing scheme, and other specifications for network and computing devices to communicate over the network. Internet Protocol Version 4 (IPv4) is the fourth revision of the IP. IPv4 uses a 32-bit address scheme allowing for a total of 2^32 IP addresses, where each IP address is a numerical label assigned to a device connected to the network. The IP address is a unique identifier for a device and each device needs its own IP address. The rapid development of the Internet has reached a point where most IPv4 addresses have already been distributed. This rapid growth of Internet data traffic is requiring service provider's to allocate more and more of their limited IPv4 IP address inventory to high speed data subscribers prior to completion of the service provider's migration to the expanded address space enabled with Internet Protocol Version 6 (IPv6), which is the sixth revision of the IP and uses a 128-bit address, theoretically allowing 2^128 IP addresses.

IPv6 transition technology facilitates the transitioning of the Internet from the IPv4 infrastructure to the IPv6 networks since IPv4 and IPv6 are not directly interoperable. Mapping of Address and Port (MAP) is an IPv6 transition technology that allows IPv4 addresses to be translated (Mapping of Address and Port using translation (MAP-T)) or encapsulated (Mapping of Address and Port using encapsulation (MAP-E)) into IPv6 without the need for stateful translation on the service provider network. This enables service providers the ability to leverage IPv6 only networks to co-exist with IPv4-only devices on the subscriber's network in a manner that has minimal impact on the user experience. However, there are no mechanisms which verify that the MAP-T IPv6 transition technology is correctly performing translations from IPv4 to IPv6 and from IPv6 to IPv4 at a MAP data plane level.

SUMMARY

Disclosed herein are methods and systems for Mapping of Address and Port using translation (MAP-T) data plane verification.

In implementations, a method for performing a MAP-T data plane verification includes initiating, by a diagnostic server provisioned with at least MAP-T diagnostic rules, a MAP-T diagnostic on a border relay provisioned with MAP-T rules, generating, by the diagnostic server, a diagnostic packet per the MAP-T diagnostic rules, sending, by the diagnostic server, the diagnostic packet to the border relay, performing, by the border relay, a translation on the diagnostic packet per the provisioned MAP-T rules, analyzing, by the diagnostic server to generate a report, at least a translation accuracy of a received translated diagnostic packet, and configuring at least one device based on a received report.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
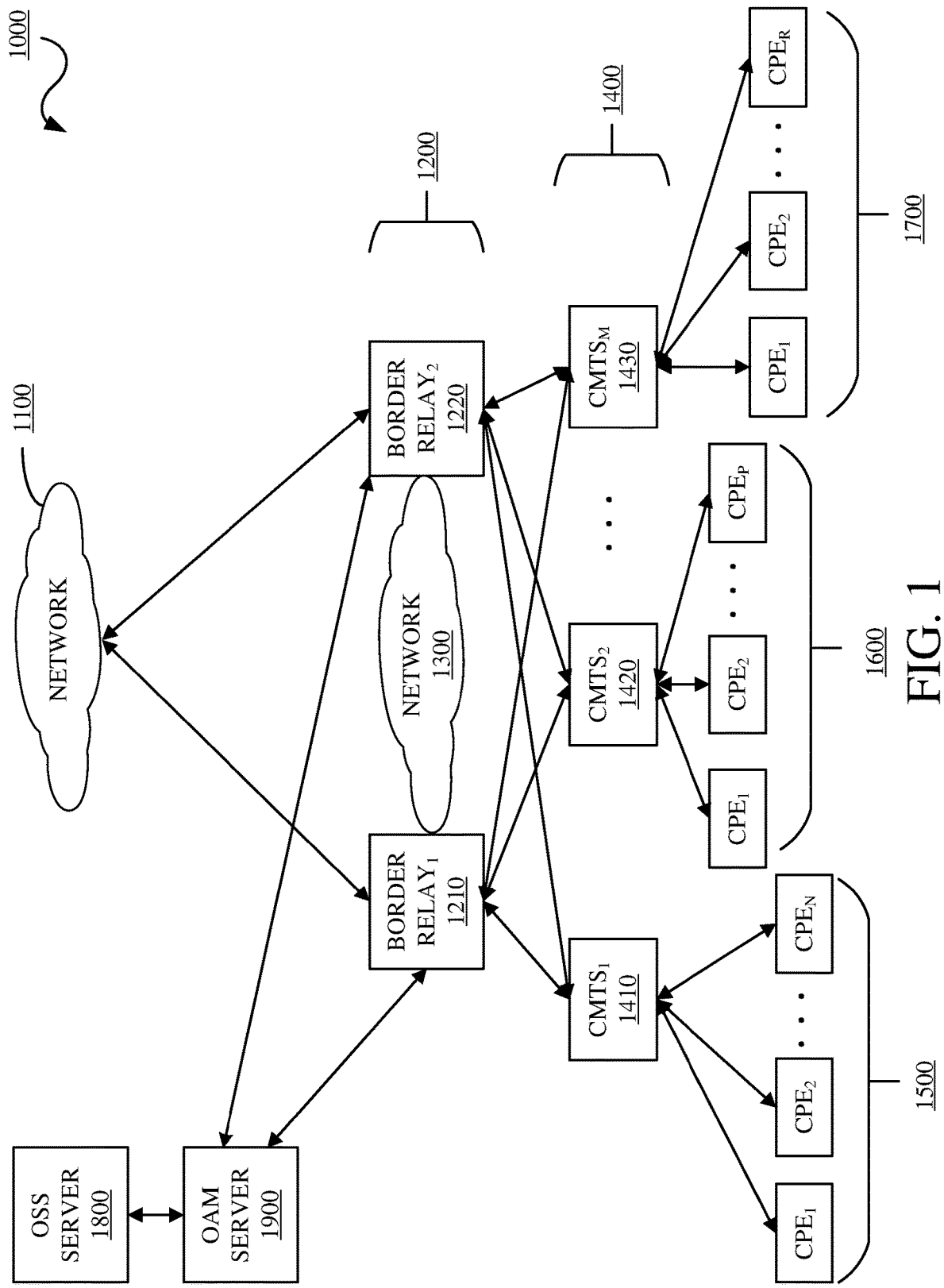
FIG. 1 is a diagram of an example network in accordance with embodiments of this disclosure.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer", "computing device", or "computing platform" includes any unit, or combination of units, in a distributive platform, centralized platform, or combinations thereof, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

As noted, MAP-T is an IPv6 transition technology that allows IPv4 addresses to be translated or encapsulated into IPv6 without the need for stateful translation on the service provider network. This enables service providers the ability to leverage IPv6 only networks to co-exist with IPv4-only devices on the subscriber's network in a manner that has minimal impact on the user experience.

MAP defines two modes of operation. The MAP-E mode uses encapsulation for transport of IPv4 traffic in an IPv6 header and follows encapsulation rules defined in [RFC 2473]. The MAP-T mode uses the stateless IP/ICMP translation algorithm (SIIT) to convert IPv4 headers into IPv6 headers and follows stateless translation rules defined in [RFC 6145].

MAP-E and MAP-T offer distinct advantages over other co-existence technologies, such as NAT444/NAT44 or Dual-Stack Lite. The primary advantage is that translation or de-encapsulation at the Border Relay (BR) is accomplished through stateless mappings between the IPv4 address and the IPv6 prefix. The critical difference between the MAP methodology and traditional translation technologies, such as NAT44, is that MAP assigns a port range to the CPEs that share the same public IPv4 address. This allows the address and port range combination that is translated or encapsulated in the IPv6 header to be represented uniquely. In this way, IPv6 aggregation logic can be used to direct packets in a stateless fashion, rather than a relying upon per-subscriber or per-connection criteria to determine state.

MAP-T provides additional advantages by providing a more flexible topology for the MAP domain. Because traffic to and from the customer premise can be forwarded in IPv6 natively, traffic classification and routing optimization policies configured for the IPv6-only network can be easily enforced. MAP also provides a more scalable solution than the alternative technologies because factors such as port consumption and the number of stateful translations at the CGN are reduced or eliminated.

Described herein are methods and systems for Mapping of Address and Port using translation (MAP-T) data plane verification. In an implementation, the described techniques provide a mechanism for verifying or validating that a network device provisioned with or employing MAP-T to translate between Internet Protocol Version 4 (IPv4) and Internet Protocol Version 6 (IPv6) is working properly. That is, verification or validation is done at the MAP-T data place level as opposed to being done at the control plane or IP data plane.

In implementations, an operations, administration, and management (OAM) or diagnostics management server can send a MAP-T diagnostic packet to a MAP-T provisioned network device. The OAM server can act as both a source entity and a destination entity. That is, the MAP-T diagnostic packet can have as a destination the IP address of the OAM server. The MAP-T diagnostic packet can get looped back to the sender, can be received, and can be verified. The OAM server can send a MAP-T diagnostic packet with either an IPv4 or IPv6 prefix to the MAP-T provisioned network device to test MAP-T data plane functionality in both directions. An operations support systems (OSS) or network management server can configure the MAP-T provisioned network device or other devices based on verification results received via the OAM server. The verification results can include, for example, latency, packet loss, and other like packet characteristics.

In implementations, a MAP-T provisioned network device can include a hardware component or circuit which can support a first type or set of packets and a MAP-T provisioned offload server component which can support a second type or set of packets. In these implementations, different MAP-T diagnostic packets can be configured to exercise both components and associated pathways.

FIG. 1 is a diagram of an example network 1000 in accordance with some embodiments of this disclosure. The network 1000 includes a network 1100, border relays 1200 including at least border relay$_1$ 1210 and border relay$_2$ 1220, network 1300, cable modem termination system (CMTS) 1400 including at least CMTS$_1$ 1410, CMTS$_2$ 1420, and CMTS$_3$ 1430, customer premise equipment (CPE) including CPE$_1$, CPE$_2$, ..., CPE$_N$ 1500, CPE$_1$, CPE$_2$, ..., CPE$_P$ 1600, and CPE$_1$, CPE$_2$, ..., CPE$_R$ 1700, OSS server 1800, and OAM server 1900. The network 1100, the border relays 1200, the network 1300, the 1400, the CPE$_1$, CPE$_2$, ..., CPE$_N$ 1500, the CPE$_1$, CPE$_2$, ..., CPE$_P$ 1600, the CPE$_1$, CPE$_2$, ..., CPE$_R$ 1700, the OSS server 1800, and the OAM server 1900 can be connected to or be in communication with (collectively "connected to") each other, as appropriate and applicable, using wired and wireless techniques, systems, and devices, including but not limited to, hybrid coaxial fiber, coaxial fiber, the Internet, an intranet, a low power WAN (LPWAN), LANs, WANs, a public network, a private network, a cellular network, a WiFi-based network, a telephone network, a landline network, a public switched telephone network (PSTN), a wireless network, a wired network, a private branch exchange (PBX), an Integrated Services Digital Network (ISDN), a IP Multimedia Services (IMS) network, a Voice over Internet Protocol (VoIP) network, and the like including any combinations thereof. The network 1000 and the components therein may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

The network 1100 can be, but is not limited to, hybrid coaxial fiber, coaxial fiber, the Internet, an intranet, a low power WAN (LPWAN), LANs, WANs, a public network, a private network, a cellular network, a WiFi-based network, a telephone network, a landline network, a public switched telephone network (PSTN), a wireless network, a wired network, a private branch exchange (PBX), an Integrated Services Digital Network (ISDN), a IP Multimedia Services (IMS) network, a Voice over Internet Protocol (VoIP) network, and the like including any combinations thereof. In implementations, the network 1100 can be an IPv4 based network. In implementations, the network 1100 can be a combination of an IPv4 based network and an IPv6 based network, where packets coming out of the network 1100 and entering the network 1100 are IPv4 packets.

The border relays 1200 including at least border relay$_1$ 1210 and border relay$_2$ 1220 can be provisioned with MAP-T rules to translate and transfer packets from an IPv4 domain to an IPv6 domain and from the IPv6 domain to the IPv4 domain. Although the description herein uses border relays, the scope of the specification and claims are applicable to network devices provisioned with MAP-T including, but not limited to, border relays, border routers, and like devices.

The network 1300 can be, but is not limited to, hybrid coaxial fiber, coaxial fiber, the Internet, an intranet, a low power WAN (LPWAN), LANs, WANs, a public network, a private network, a cellular network, a WiFi-based network, a telephone network, a landline network, a public switched telephone network (PSTN), a wireless network, a wired network, a private branch exchange (PBX), an Integrated Services Digital Network (ISDN), a IP Multimedia Services (IMS) network, a Voice over Internet Protocol (VoIP) network, and the like including any combinations thereof. The network 1300 can be an IPv4 based network, IPv6 based network, other networks, or combinations thereof.

The CMTS 1410, 1430, and 1430 are typically located in a service provider's central office, headend, or hubsite and provides high speed data services, such as cable Internet or Voice over Internet Protocol, to service provider subscribers.

The CPEs 1500, 1600, and 1700, can be, but are not limited to, routers, network switches, gateways, set-top boxes, fixed mobile convergence products, home networking adapters and Internet access gateways that enable customers to access a service provider's services and distribute them in a residence, enterprise, office, or like infrastructure. In implementations, the CPEs 1500, 1600, and 1700 may be equipment located at a customer's premises and connected with a service provider's network and/or telecommunication equipment, including for example, CMTS 1410, 1420, 1430, respectively. In implementations, one or more of the CPEs 1500, 1600, and 1700 can be provisioned with MAP-T rules. The 1500, 1600, and 1700 can be referred to as customer edge (CE) devices.

The OSS server 1800 or network management server can be used by a service provider to monitor, control, analyze and manage a service provider network and to support management functions such as network inventory, service provisioning, network configuration, and fault management. The OSS server 1800 can initiate or configure the OAM server 1900 to perform or execute diagnostics on the border relays 1200. The OSS server 1800 can configure or initiate configuration of one or more border relays 1200, one or more CMTS 1400, one or more CPE 1500, 1600, and 1700, other network devices, or combinations thereof in response to diagnostic results received from the OAM server 1900.

The OAM server 1900 can be provisioned with MAP-T rules including, but not limited to, diagnostic MAP-T rules where the OAM server 1900 is designated as the source and destination entities. The OAM server 1900 can generate diagnostic packets based on the diagnostic MAP-T rules. The source and destination fields of the diagnostic packets are configured with a medium access control (MAC) address or IP address of the OAM server 1900. The OAM server 1900 can send diagnostic packets to network devices provisioned with MAP-T to verify MAP-T data place functionality including translation functionality.

As noted, MAP-T is an IPv6 transition technology that allows IPv4 addresses to be translated into IPv6 (and vice versa) without the need for stateful translation on the service provider network. This enables service providers the ability to leverage IPv6 only networks to co-exist with IPv4-only devices on the service provider's network in a manner that has minimal impact on the user experience. MAP-T uses a stateless IP/ICMP translation algorithm (SIIT) to convert IPv4 headers into IPv6 headers and follows stateless translation rules as defined in RFC 6145, for example.

MAP-T offers distinct advantages over other co-existence technologies, such as NAT444/NAT44 or Dual-Stack Lite. The primary advantage is that translation at border relays is accomplished through stateless mappings between the IPv4 address and the IPv6 prefix. A difference between the MAP methodology and traditional translation technologies, such as NAT44, is that MAP-T assigns a port range to the CPEs that share the same public IPv4 address. This allows the address and port range combination that is translated in the IPv6 header to be represented uniquely. In this way, IPv6 aggregation logic can be used to direct packets in a stateless fashion, rather than a relying upon per-subscriber or per-connection criteria to determine state. MAP-T provides additional advantages by providing a more flexible topology for the MAP domain. Because traffic to and from the customer premise can be forwarded in IPv6 natively, traffic classification and routing optimization policies configured for the IPv6-only network can be easily enforced.

A MAP-T domain can be defined as one or more border relay nodes that serve within an administrative boundary which may coincide with a geographical, regional or subscriber base of CMTS and/or CPE devices. CPE devices with MAP-T capabilities translate the IPv4 traffic that egresses the subscriber home network. Using defined and provisioned mapping rules, the border relay forwards this traffic to the IPv4 internet. Public IPv4 traffic destined for the customer network is translated in the same way at the border relay and is again converted to IPv4 at the ingress path of the CPE.

MAP domains are defined through a set of parameters that are shared between the border relay and the set of CMTS or CPE devices assigned to the domain. These parameters are configured on the border relay. For CPE devices, configurations may be established statically, via a downloaded configuration file, or through open encodings conveyed via DHCP. All nodes in the MAP-T domain share the following set of common parameters: IPv4 Prefix, IPv6 Prefix, default mapping rule (DMR) Prefix, embedded address (EA) Length, port set ID (PSID) Offset, and PSID Length. The IPv4 Prefix is a global IPv4 prefix which is the MAP source address for traffic towards the Internet. The IPv6 Prefix is the CPE IPv6 space which is used as the IPv6 space between the CPE and border relay. The DMR Prefix is the default mapping rule for translating all outside IPv4 source addresses to the IPv6 MAP-T domain. The EA Length is a set of bits representing the mapping of IPv4 addresses and optionally the layer-4 ports for a given mapping rule. The PSID Offset provides the means to define the lowest port number that is assignable by a given mapping rule. This attribute also determines the number of sequential ports supported by any defined port set. The PSID Length is the number of MAP bits in an IPv4 MAP port. This defines the sharing ratio of a given MAP rule. This can also be determined by taking the EA length and subtracting the amount of host bits in the IPv4 rule prefix.

IPv4 to IPv6 packet conversion follow a general set of rules or actions. The IPv4 addresses will be converted into IPv6 based on the MAP algorithm. The source IPv4 addresses will use RFC6052 encoding to embed the source IPv4 address within the DMR prefix. The destination IPv4 will be subject to a lookup against the MAP IPv4 prefixes to find the mapped IPv6 prefix associated with the IPv4 destination address. It will be embedded as described in RFC 7599, and the PSID bits will be placed as a suffix to the embedded address. The Version, Internet Header Length, and Internet Header checksum fields are ignored for the sake of conversion. The version will become IPv6 by default, while the Internet header checksum and Internet Header Length will be discarded because there is not a related IPv6 field. For the IPv4 Type of Service bits, these can be directly mapped to the IPv6 traffic class, if the network is using post-RFC 2474 DSCP mappings of these bits, rather than older Type of Service mappings. This allows for quality of service (QoS) treatment to be similar on both the IPv4 and IPv6 sides of translation. The IPv4 total length is used to fill the IPv6 payload length field after subtraction of the IPv4 header and any included IPv4 options. The IPv4 protocol and time-to-live (TTL) fields are directly copied to the IPv6 next header and hop limit fields. The IP Identification field, the Don't Fragment Field, the More Fragments field, and the Fragment offset fields are left blank for translations that don't require fragmentation. If fragmentation or forwarding of a fragment stream is required, then the MAP-T rules for fragmenting and forwarding fragments are followed. Packets with IP options are either discarded or stripped of their IP options before translation.

Similarly, IPv6 to IPv4 packet conversion follow a general set of rules or actions. For IPv6 to IPv4 packets, the embedded IPv4 address information and Embedded Address bits always exists in the IPv6 packet. For the destination IPv6 side, this is de-embedding the IPv4 destination embedded in the IPv6 destination address. For the source IPv4 address and source IPv4 port, this can be drawn directly from the packet. Anti-spoofing needs to be performed to ensure the embedded IPv4 address is the correctly mapped IPv4 prefix to the source IPv6 prefix. The source port needs to be compared against the EA bits to ensure they are correct. This means anti-spoofing is applied for MAP packets. The IPv6 flow label will be discarded, as there is not a relevant IPv4 header field. The IPv4 version field will always be set to IPv4, and the Internet Header Length will always be 5, as IP options will not be included. IPv6 Next Header and IPv6 Hop Limit will be directly translated to IPv4 Protocol and TTL, respectively. IPv6 Traffic Class can be directly translated to IPv4 Type of Service, assuming both sides are using Differentiated Services Code Point (DSCP) markings. The IPv4 Total Length Field will be set to IPv6 Payload Length+ 20 bytes for the IPv4 header.

Operationally, with reference to FIG. 1, based on provisioned MAP-T rules for normal or non-diagnostic operation on the CPEs and the border relays, an IPv6 packet from a CPE, e.g., $CPE_1$, $CPE_2$, . . . , $CPE_N$ 1500, $CPE_1$, $CPE_2$, . . . , $CPE_P$ 1600, and $CPE_1$, $CPE_2$, . . . , $CPE_R$ 1700 is sent to an appropriate CMTS, e.g., $CMTS_1$ 1410, $CMTS_2$ 1420, and $CMTS_3$ 1430. The appropriate CMTS sends the IPv6 packet to a border relay, e.g., border relay$_1$ 1210 and border relay$_2$ 1220. The border relay performs an IPv6 to IPv4 translation in accordance with the provisioned MAP-T rules and sends the translate IPv6-IPv4 packet to the IPv4 based network 1100. In implementations, an IPv4 to IPv6 translation can be done at the CPE if the CPE receives an IPv4 packet. In implementations, the IPv4 based network 1100 can be the source entity and the CPE can be the destination entity.

Figure 2:
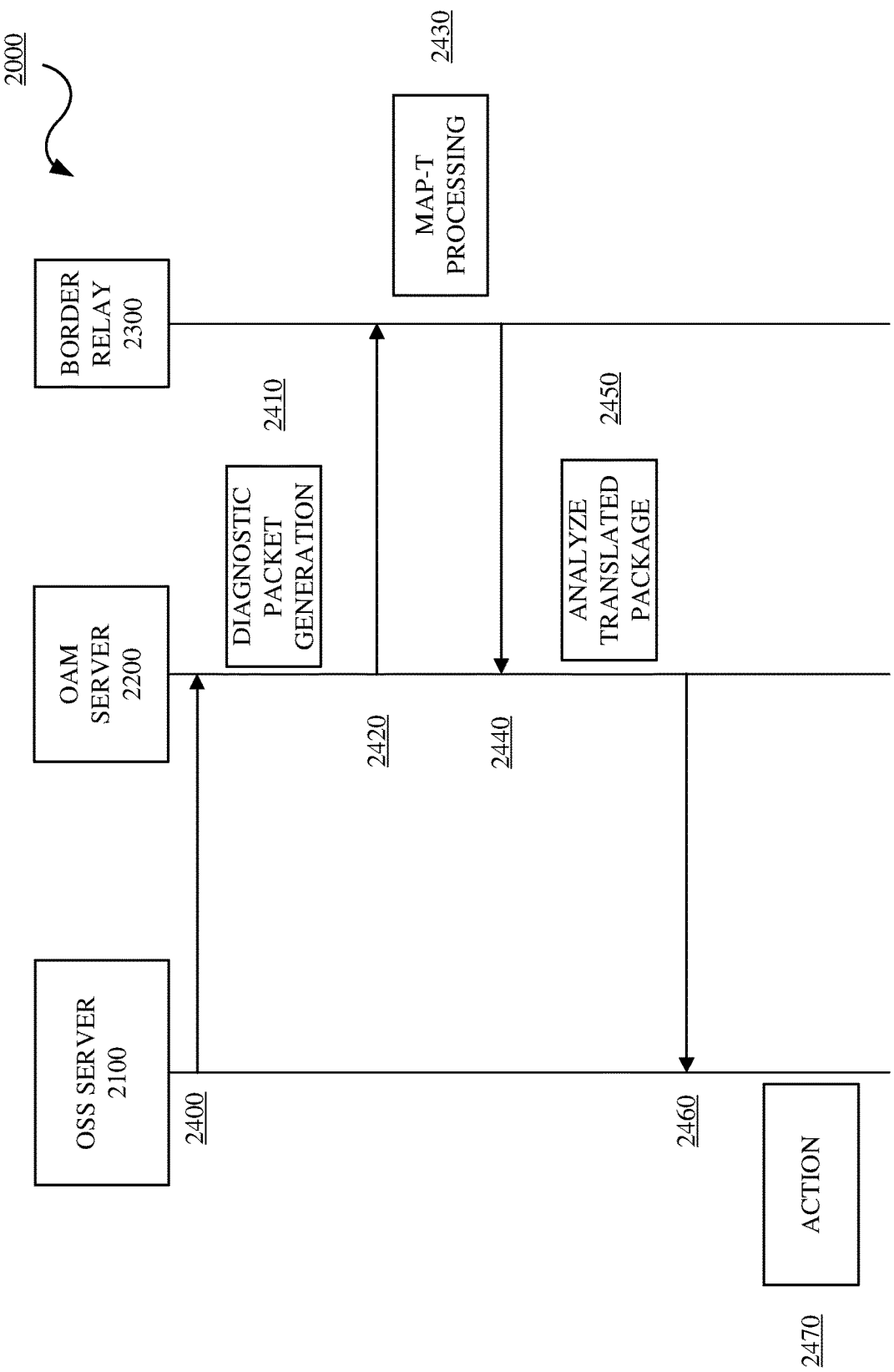
FIG. 2 is a diagram of an example flow diagram of Mapping of Address and Port using translation (MAP-T) data plane verification for the network of FIG. 1 in accordance with embodiments of this disclosure.

FIG. 2 is a diagram of an example flow diagram 2000 of MAP-T data plane verification for the network of FIG. 1 in accordance with embodiments of this disclosure. The MAP-T data plane verification flow diagram 2000 describes communications and events with respect to an OSS server 2100, an OAM server 2200, and a border relay 2300. The flow diagram 2000 and the components therein may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein. The description is also applicable to FIG. 1 as appropriate.

The OSS server 2100 can instruct the OAM server 2200 to perform MAP-T data plane diagnostics (2400). In implementations, the OSS server 2100 can send instructions as needed, on demand, based on events, configure a periodic schedule, or combinations thereof. The OAM server 2200 can generate a diagnostic packet in accordance with provisioned MAP-T diagnostic rules (2410). The diagnostic packet can include a MAC address or IP address of the OAM server 2200 as a source entity and a destination entity. In implementations, the diagnostic packet can be an IPv4 packet. In implementations, the diagnostic packet can be an IPv6 packet. The OAM server 2200 can send the diagnostic packet to the border relay 2300 (2420). In implementations, multiple border relays are associated with a CPE or CMTS. Each border relay of the multiple border relays is tested on an individual basis as shown in FIG. 1. The border relay 2300 can perform MAP-T in accordance with provisioned MAP-T rules for normal operation (2430). The border relay 2300 can send the translated diagnostic packet to the OAM server 2200 (which is the designated destination entity) (2440). The OAM server 2200 can analyze the translated packet for correct translation, latency, and other packet characteristics and generate a report (2450). The OAM server 2200 can send a report to the OSS server 2100 (2460). The OSS server 2100 can execute an action on or configure one or more network devices including the border relay 2300 based on issues noted in the report (2470).

Figure 3:
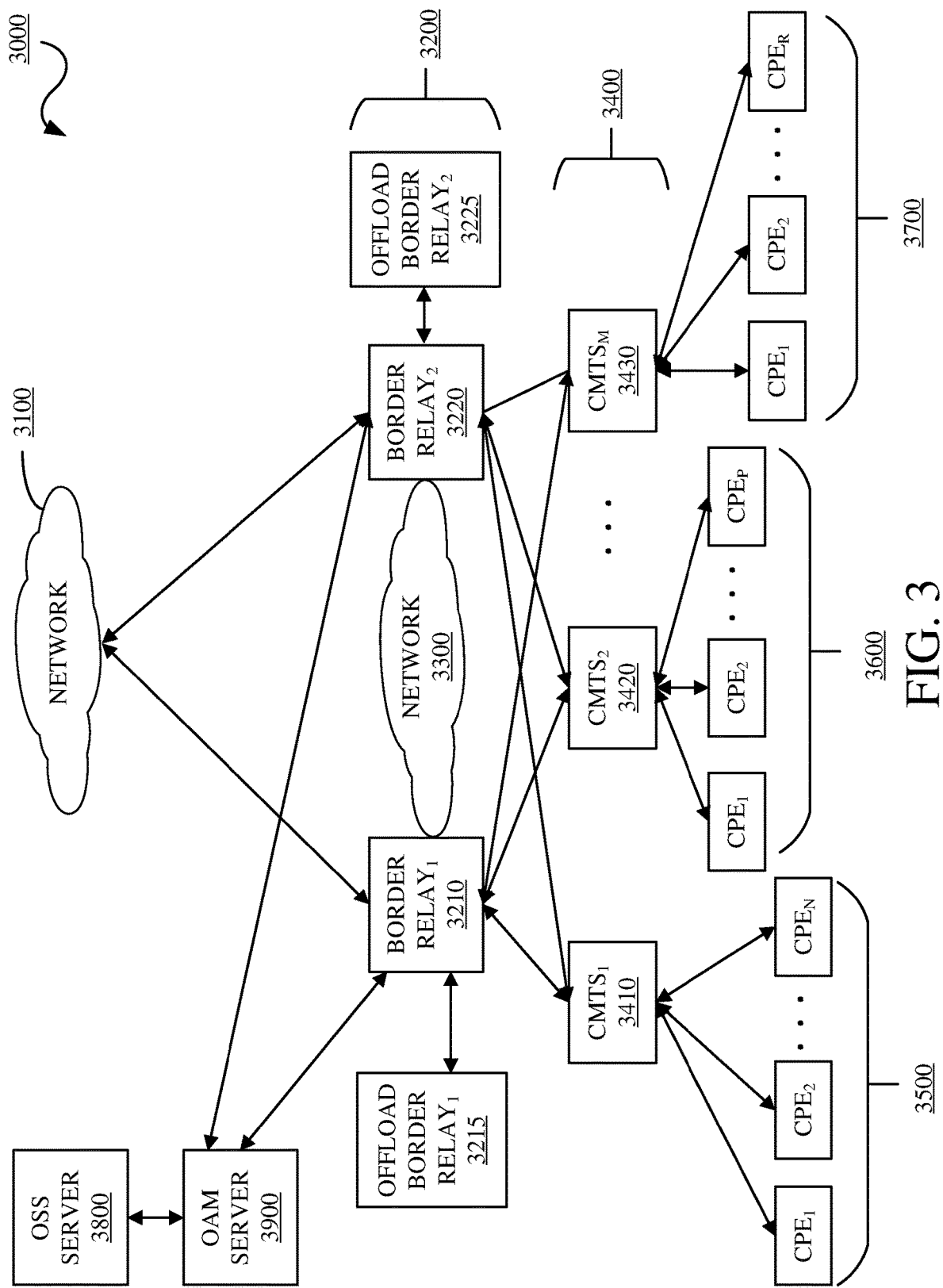
FIG. 3 is a diagram of an example network in accordance with embodiments of this disclosure.

FIG. 3 is a diagram of an example network 3000 in accordance with some embodiments of this disclosure. The network 3000 includes a network 3100, border relays 3200 including at least border relay$_1$ 3210, offload border relay$_1$ 3215, border relay$_2$ 3220 and offload border relay$_2$ 3225, network 3300, CMTS 3400 including at least CMTS$_1$ 3410, CMTS$_2$ 3420, and CMTS$_3$ 3430, CPE including CPE$_1$, CPE$_2$, ..., CPE$_N$ 3500, CPE$_1$, CPE$_2$, ..., CPE$_P$ 3600, and CPE$_1$, CPE$_2$, ..., CPE$_R$ 3700, OSS server 3800, and OAM server 3900. The network 3100, the border relays 3200, the network 3300, the 3400, the CPE$_1$, CPE$_2$, ..., CPE$_N$ 3500, the CPE$_1$, CPE$_2$, ..., CPE$_P$ 3600, the CPE$_1$, CPE$_2$, ..., CPE$_R$ 3700, the OSS server 3800, and the OAM server 3900 can be connected to each other, as appropriate and applicable, using wired and wireless techniques, systems, and devices, including but not limited to, hybrid coaxial fiber, coaxial fiber, the Internet, an intranet, a low power WAN (LPWAN), LANs, WANs, a public network, a private network, a cellular network, a WiFi-based network, a telephone network, a landline network, a public switched telephone network (PSTN), a wireless network, a wired network, a private branch exchange (PBX), an Integrated Services Digital Network (ISDN), a IP Multimedia Services (IMS) network, a Voice over Internet Protocol (VoIP) network, and the like including any combinations thereof. The network 3000 and the components therein may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

The network 3100 can be, but is not limited to, hybrid coaxial fiber, coaxial fiber, the Internet, an intranet, a low power WAN (LPWAN), LANs, WANs, a public network, a private network, a cellular network, a WiFi-based network, a telephone network, a landline network, a public switched telephone network (PSTN), a wireless network, a wired network, a private branch exchange (PBX), an Integrated Services Digital Network (ISDN), a IP Multimedia Services (IMS) network, a Voice over Internet Protocol (VoIP) network, and the like including any combinations thereof. In implementations, the network 3100 can be an IPv4 based network. In implementations, the network 3100 can be a combination of an IPv4 based network and an IPv6 based network, where packets coming out of the network 3100 and entering the network 3100 are IPv4 packets.

The border relays 3200 including at least the border relay$_1$ 3210, the offload border relay$_1$ 3215, the border relay$_2$ 3220 and the offload border relay$_2$ 3225 can be provisioned with MAP-T rules to translate and transfer packets from an IPv4 domain to an IPv6 domain and from the IPv6 domain to the IPv4 domain. The border relay$_1$ 3210 and the border relay$_2$ 3220 can be hardware relays or circuits configured as a MAP-T accelerator to process packets of a first type. The offload border relay$_1$ 3215 and the offload border relay$_2$ 3225 can be software implemented on a computing devices, servers, or the like to process packets of a second type. The border relay$_1$ 3210 and the border relay$_2$ 3220 can differentiate between the two types and route packets accordingly. In implementations, the second type of packets can require further or exceptional processing. In implementations, the second type of packets include packets which are not transmission control protocol (TCP) packets, are not user datagram protocol (UDP) packets, require fragmentation, require forwarding of fragments, have IP options, or combinations thereof. In implementations, the border relay$_1$ 3210, the offload border relay$_1$ 3215, the border relay$_2$ 3220 and the offload border relay$_2$ 3225 can be implemented as described in co-pending U.S. application entitled "APPARATUS AND METHOD FOR MAP-T OFFLOAD BORDER RELAY", filed concurrently, which is incorporated by reference in its entirety. Although the description herein uses border relays, the scope of the specification and claims are applicable to network devices provisioned with MAP-T including, but not limited to, border relays, border routers, and like devices.

The network 3300 can be, but is not limited to, hybrid coaxial fiber, coaxial fiber, the Internet, an intranet, a low power WAN (LPWAN), LANs, WANs, a public network, a private network, a cellular network, a WiFi-based network, a telephone network, a landline network, a public switched telephone network (PSTN), a wireless network, a wired network, a private branch exchange (PBX), an Integrated Services Digital Network (ISDN), a IP Multimedia Services (IMS) network, a Voice over Internet Protocol (VoIP) network, and the like including any combinations thereof. The network 3300 can be an IPv4 based network, IPv6 based network, other networks, or combinations thereof.

The CMTS 3410, 3430, and 3430 are typically located in a service provider's central office, headend, or hubsite and provides high speed data services, such as cable Internet or Voice over Internet Protocol, to service provider subscribers.

The CPEs 3500, 3600, and 3700, can be, but are not limited to, routers, network switches, gateways, set-top boxes, fixed mobile convergence products, home networking adapters and Internet access gateways that enable customers to access a service provider's services and distribute them in a residence, enterprise, office, or like infrastructure. In implementations, the CPEs 3500, 3600, and 3700 may be equipment located at a customer's premises and connected with a service provider's network and/or telecommunication equipment, including for example, CMTS 3410, 3420, 3430, respectively. In implementations, one or more of the CPEs 3500, 3600, and 3700 can be provisioned with MAP-T rules. The 3500, 3600, and 3700 can be referred to as CE devices.

The OSS server 3800 or network management server can be used by a service provider to monitor, control, analyze and manage a service provider network and to support management functions such as network inventory, service provisioning, network configuration, and fault management. The OSS server 3800 can initiate or configure the OAM server 3900 to perform or execute diagnostics on the border relays 1200. The OSS server 3800 can configure or initiate configuration of one or more border relays 3200, one or more CMTS 3400, one or more CPE 3500, 3600, and 3700, other network devices, or combinations thereof in response to diagnostic results received from the OAM server 3900.

The OAM server 3900 can be provisioned with MAP-T rules including, but not limited to, diagnostic MAP-T rules where the OAM server 3900 is designated as the source and destination entities. The OAM server 3900 can generate diagnostic packets based on the diagnostic MAP-T rules. The source and destination fields of the diagnostic packets are configured with a medium access control (MAC) address or IP address of the OAM server 3900. The OAM server 3900 can send diagnostic packets to network devices provisioned with MAP-T to verify MAP-T data place functionality including translation functionality. In implementations, the OAM server 3900 can configure the diagnostic packets by as non-TCP packets, non-UDP packets, packets requiring fragmentation, packets with multiple fragments, packets with IP options, or combinations thereof to test first type and second type packet processing.

The general MAP-T description provided herein with respect to FIG. 1 is applicable to FIG. 3.

Operationally, with reference to FIG. 3, based on provisioned MAP-T rules for normal or non-diagnostic operation on the CPEs and border relays, an IPv6 packet from a CPE, e.g., $CPE_1$, $CPE_2$, ..., $CPE_N$ 3500, $CPE_1$, $CPE_2$, ..., $CPE_P$ 3600, and $CPE_1$, $CPE_2$, ..., $CPE_R$ 3700 is sent to an appropriate CMTS, e.g., $CMTS_1$ 3410, $CMTS_2$ 3420, and $CMTS_3$ 3430. The appropriate CMTS sends the IPv6 packet to a border relay, e.g., $border\ relay_1$ 1210 and $border\ relay_2$ 1220. The border relay performs an IPv6 to IPv4 translation in accordance with the provisioned MAP-T rules and sends the translate IPv6-IPv4 packet to the IPv4 based network 3100 if the packet is a first type of packet. The border relay sends the packet to the offload border relay, e.g., the offload $border\ relay_1$ 3215 or the offload $border\ relay_2$ 3225, if the packet is a second type of packet. The offload border relay performs an IPv6 to IPv4 translation in accordance with the provisioned MAP-T rules and sends the translated IPv6-IPv4 packet to the border relay, which in turn sends the translated IPv6-IPv4 packet to the IPv4 based network 3100. In implementations, an IPv4 to IPv6 translation can be done at the CPE if the CPE receives an IPv4 packet. In implementations, the IPv4 based network 3100 can be the source entity and the CPE can be the destination entity.

Figure 4:
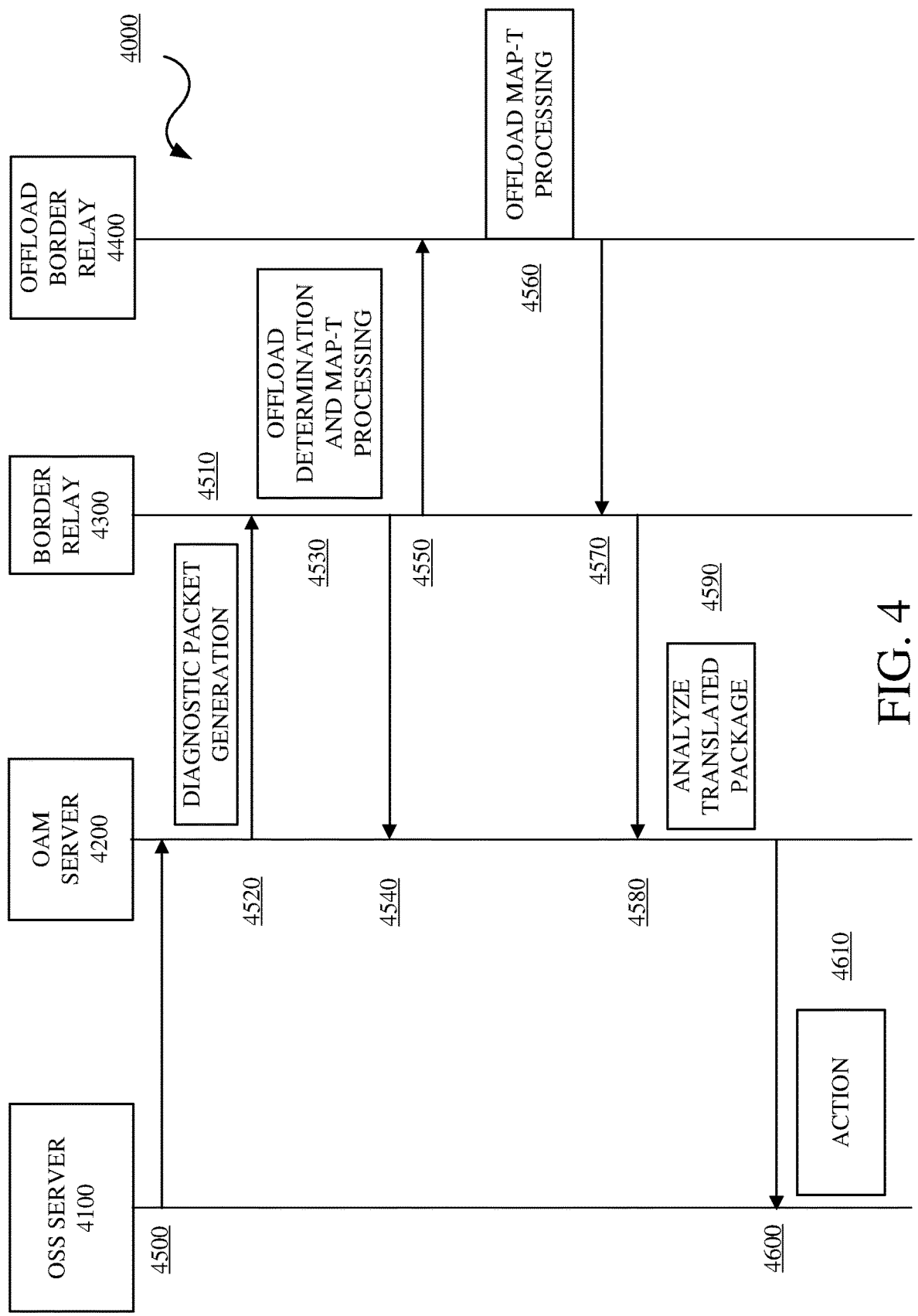
FIG. 4 is a diagram of an example flow diagram of MAP-T data plane verification for the network of FIG. 3 in accordance with embodiments of this disclosure.

FIG. 4 is a diagram of an example flow diagram 4000 of MAP-T data plane verification for the network of FIG. 3 in accordance with embodiments of this disclosure. The MAP-T data plane verification flow diagram 4000 describes communications and events with respect to an OSS server 4100, an OAM server 4200, a border relay 4300, and an offload border relay 4400. The flow diagram 4000 and the components therein may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein. The description is also applicable to FIG. 3 as appropriate.

The OSS server 4100 can instruct the OAM server 4200 to perform MAP-T data plane diagnostics (4500). In implementations, the OSS server 4100 can send instructions as needed, on demand, based on events, configure a periodic schedule, or combinations thereof. The OAM server 4200 can generate a diagnostic packet in accordance with provisioned MAP-T diagnostic rules (4510). In implementations, the diagnostic packet can be one of a first packet type or a second packet type. The diagnostic packet can include a MAC address or IP address of the OAM server 4200 as a source entity and a destination entity. In implementations, the diagnostic packet can be an IPv4 packet. In implementations, the diagnostic packet can be an IPv6 packet. The OAM server 4200 can send the diagnostic packet to the border relay 4300 (4520). In implementations, multiple border relays are associated with a CPE or CMTS. Each border relay of the multiple border relays is tested on an individual basis as shown in FIG. 3. The border relay 4300 can perform MAP-T in accordance with provisioned MAP-T rules for normal operation if it is a first type packet (4530). The border relay 4300 can send the translated diagnostic packet to the OAM server 4200 (which is the designated destination entity) (4540). The border relay 4300 can send the diagnostic packet to the offload border relay 4400 if it is a second type packet (4550). The offload border relay 4400 can perform MAP-T in accordance with provisioned MAP-T rules for normal operation if it is a second type packet (4560). The offload border relay 4400 can send the translated diagnostic packet to the border relay (4570), which in turn can send the translated diagnostic packet to the OAM server 4200 (4580). The OAM server 4200 can analyze the translated diagnostic packet for correct translation, latency, and other packet characteristics and generate a report (4590). The OAM server 4200 can send a report to the OSS server 2100 (4600). The OSS server 2100 can execute an action on or configure one or more network devices including the border relay 2300 based on issues noted in the report (4610).

Figure 5:
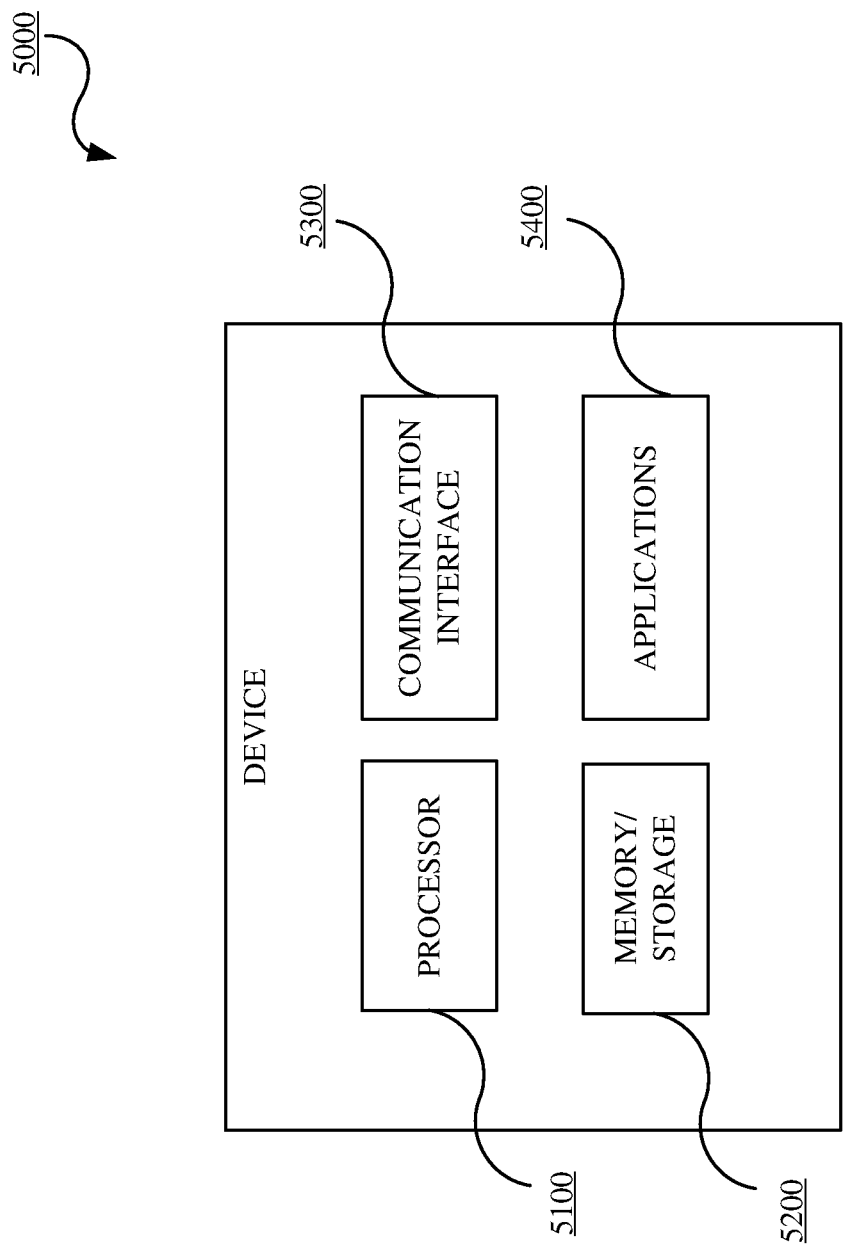
FIG. 5 is a block diagram of an example of a device in accordance with embodiments of this disclosure.

FIG. 5 is a block diagram of an example of a device 5000 in accordance with embodiments of this disclosure. The device 5000 may include, but is not limited to, a processor 5100, a memory/storage 5200, a communication interface 5300, and applications 5400. The device 5000 may include or implement, for example, the border relays 1200 including at least $border\ relay_1$ 1210 and $border\ relay_2$ 1220, the CMTS 1400 including at least $CMTS_1$ 1410, $CMTS_2$ 1420, and CMTS$_3$ 1430, the CPE including CPE$_1$, CPE$_2$, . . . , CPE$_N$ 1500, CPE$_1$, CPE$_2$, . . . , CPE$_P$ 1600, and CPE$_1$, CPE$_2$, . . . , CPE$_R$ 1700, the OSS server 1800, the OAM server 1900, the OSS server 2100, the OAM server 2200, the border relay 2300, the border relays 3200 including at least border relay$_1$ 3210, offload border relay$_1$ 3215, border relay$_2$ 3220 and offload border relay$_2$ 3225, the CMTS 3400 including at least CMTS$_1$ 3410, CMTS$_2$ 3420, and CMTS$_3$ 3430, the CPE including CPE$_1$, CPE$_2$, . . . , CPE$_N$ 3500, CPE$_1$, CPE$_2$, . . . , CPE$_P$ 3600, and CPE$_1$, CPE$_2$, . . . , CPE$_R$ 3700, the OSS server 3800, the OAM server 3900, the OSS server 4100, the OAM server 4200, the border relay 4300, and the offload border relay 4400. The applications can be, but not limited to, the software on the offload border relays and the like. In an implementation, appropriate memory/storage 5200 may store MAP-T rules, diagnostic MAP-T rules, reports, and the like. In an implementation, appropriate memory/storage 3200 is encoded with instructions for at least controlling and managing the MAP-T data plane diagnostic methods and techniques described herein. The MAP-T data plane diagnostic techniques or methods described herein may be stored in appropriate memory/storage 5200 and executed by the appropriate processor 5100 in cooperation with the memory/storage 5200, the communications interface 5300, and applications 5400, as appropriate. The device 5000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 6:
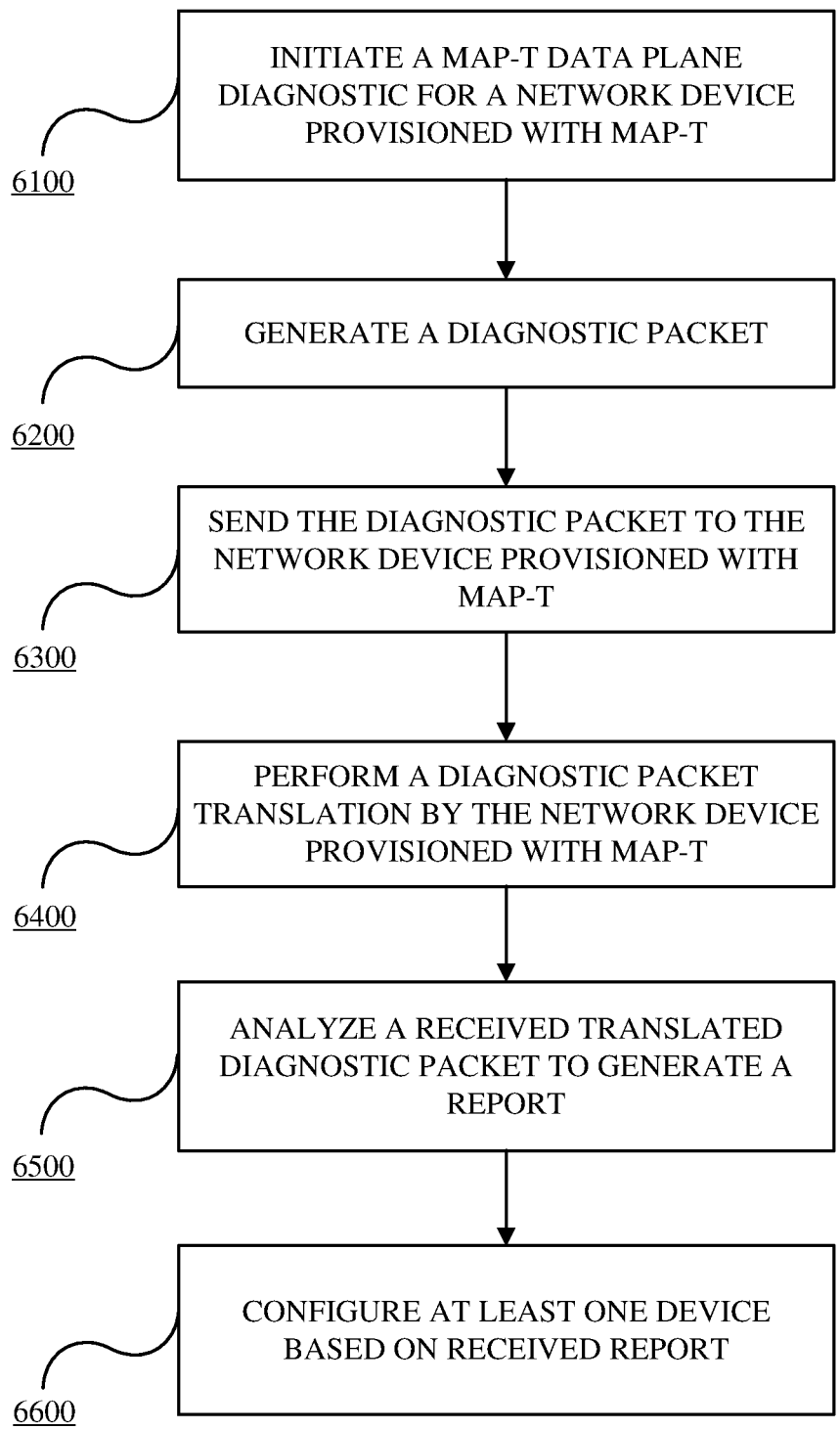
FIG. 6 is a flowchart of an example method for MAP-T data plane verification in accordance with embodiments of this disclosure.

FIG. 6 is a flowchart of an example method 6000 for MAP-T data plane diagnostics in accordance with embodiments of this disclosure. The method 6000 includes: initiating 6100 a MAP-T data plane diagnostic for a network device provisioned with MAP-T; generating 6200 a diagnostic packet; sending 6300 the diagnostic packet to the network device provisioned with MAP-T; performing 6400 a diagnostic packet translation by the network device provisioned with MAP-T; analyzing 6500 a received translated diagnostic packet to generate a report; and configuring 6600 at least one device based on a received report. For example, the method 6000 may be implemented, as applicable and appropriate, by the border relays 1200 including at least border relay$_1$ 1210 and border relay$_2$ 1220, the CMTS 1400 including at least CMTS$_1$ 1410, CMTS$_2$ 1420, and CMTS$_3$ 1430, the CPE including CPE$_1$, CPE$_2$, . . . , CPE$_N$ 1500, CPE$_1$, CPE$_2$, . . . , CPE$_P$ 1600, and CPE$_1$, CPE$_2$, . . . , CPE$_R$ 1700, the OSS server 1800, the OAM server 1900, the OSS server 2100, the OAM server 2200, the border relay 2300, the border relays 3200 including at least border relay$_1$ 3210, offload border relay$_1$ 3215, border relay$_2$ 3220 and offload border relay$_2$ 3225, the CMTS 3400 including at least CMTS$_1$ 3410, CMTS$_2$ 3420, and CMTS$_3$ 3430, the CPE including CPE$_1$, CPE$_2$, . . . , CPE$_N$ 3500, CPE$_1$, CPE$_2$, . . . , CPE$_P$ 3600, and CPE$_1$, CPE$_2$, . . . , CPE$_R$ 3700, the OSS server 3800, the OAM server 3900, the OSS server 4100, the OAM server 4200, the border relay 4300, and the offload border relay 4400, the processor 5100, the memory/storage 5200, the communication interface 5300, and the applications 5400.

The method 6000 includes initiating 6100 a MAP-T data plane diagnostic for a network device provisioned with MAP-T. A management system server can instruct a diagnostic server to initiate a MAP-T data plane diagnostic. The diagnostics can be event driven, on demand, ad hoc, or on a periodic basis. The network device provisioned with MAP-T can be a border relay, a border router, or the like.

The method 6000 includes generating 6200 a diagnostic packet. The diagnostic server can be provisioned with MAP-T data plane diagnostic rules by the management system server or other service provider system. The MAP-T data plane diagnostic rules include setting a source and destination address field to a MAC address or IP address of the diagnostic server. In implementations, the MAP-T data plane diagnostic rules can set a communications protocol field. In implementations, the MAP-T data plane diagnostic rules can set fields requiring a fragmentation. In implementations, the MAP-T data plane diagnostic rules can set fields to indicate multiple fragments need to be forwarded. In implementations, the MAP-T data plane diagnostic rules can set an IP options field. In implementations, the MAP-T data plane diagnostic rules can generate a first type diagnostic packet or a second type diagnostic packet. The diagnostic packet can be configured to test MAP-T translation in either direction, IPv4 to IPv6 or IPv6 to IPv4.

The method 6000 includes sending 6300 the diagnostic packet to the network device provisioned with MAP-T. The diagnostic server can send diagnostic packets to each network device provisioned with MAP-T.

The method 6000 includes performing 6400 a diagnostic packet translation by the network device provisioned with MAP-T. In implementations, the network device provisioned with MAP-T can perform a translation per provisioned MAP-T rules. In implementations, the network device provisioned with MAP-T can include a hardware accelerator and a software component. The network device provisioned with MAP-T can determine the type of diagnostic packet. The hardware accelerator can perform the translation per provisioned MAP-T rules for a first packet type and the software component can perform the translation per provisioned MAP-T rules for a second packet type.

The method 6000 includes analyzing 6500 a received translated diagnostic packet to generate a report. The network device provisioned with MAP-T can send the translated diagnostic packet to the network device provisioned with MAP-T. Per the MAP-T diagnostic rules, the diagnostic server can act as both the IPv4 Internet source/destination and as the CPE/CMTS destination/source. The diagnostic server analyzes the translated diagnostic packet with respect to translation accuracy by examining multiple fields in the packet, latency, and other packet characteristics. The diagnostic server generates a report based on the analysis and sends the report to the management server.

The method 6000 includes configuring 6600 at least one device based on a received report. In implementations, the management system server can send configuration data to devices including the network device provisioned with MAP-T, the CMTS, the CPE, network devices, and the like when issues are present in the report. In implementations, the management system server can send configuration data to devices including the network device provisioned with MAP-T, the CMTS, the CPE, network devices, and the like to improve or enhance performance based on data in the report.

In general, a method for performing a MAP-T data plane verification includes initiating, by a diagnostic server provisioned with at least MAP-T diagnostic rules, a MAP-T diagnostic on a border relay provisioned with MAP-T rules, generating, by the diagnostic server, a diagnostic packet per the MAP-T diagnostic rules, sending, by the diagnostic server, the diagnostic packet to the border relay, performing, by the border relay, a translation on the diagnostic packet per the provisioned MAP-T rules, analyzing, by the diagnostic server to generate a report, at least a translation accuracy of a received translated diagnostic packet, and configuring at least one device based on a received report. In implementations, the generating further including setting, by the diagnostic server, a source address and a destination address to an address of the diagnostic server. In implementations, the diagnostic packet is one of an Internet Protocol Version 4 (IPv4) or an Internet Protocol Version 6 (IPv6) format. In implementations, the generating further includes setting, by the diagnostic server, at least one defined field to differentiate between a first type diagnostic packet and a second type diagnostic packet. In implementations, the performing further includes determining, by the border relay, whether the diagnostic packet is the first type diagnostic packet or the second type diagnostic packet. In implementations, the performing further including performing, by the border relay, a translation on the diagnostic packet per the provisioned MAP-T rules via a first path when the diagnostic packet is the first type diagnostic packet. In implementations, the performing further including performing, by the border relay, a translation on the diagnostic packet per the provisioned MAP-T rules via a second path when the diagnostic packet is the second type diagnostic packet. In implementations, the at least one defined field is at least one of a communication protocol field, one or more fields indicative of fragmentation, one or more fields indicative of multiple fragments, or an Internet Protocol (IP) options field.

In general, a system including a network device provisioned with at least MAP-T rules, the network device configured to translate a testing packet using the provisioned MAP-T rules, a management server configured to send configuration data to at least one device based on a testing packet report, a diagnostic server in contact with the network device and the management server, the diagnostic server provisioned with at least MAP-T diagnostic rules, wherein the diagnostic server is configured to receive a MAP-T diagnostic request from the management server, form the testing packet per the MAP-T diagnostic rules, transmit the testing packet to the network device, and produce the testing packet report based on analyzed characteristics of a translated testing packet received from the network device. In implementations, the testing packet is one of an Internet Protocol Version 4 (IPv4) or an Internet Protocol Version 6 (IPv6) format. In implementations, the diagnostic server is configured to populate a source field and a destination field with an Internet Protocol (IP) address of the diagnostic server. In implementations, the diagnostic server is configured to populate one or more defined fields to establish one of a first testing packet type and a second testing packet type. In implementations, the network device is configured to resolve the testing packet as the first testing packet type or the second testing packet type, translate the testing packet using the provisioned MAP-T rules using a hardware component when the testing packet is the first testing packet type, and translate the testing packet using the provisioned MAP-T rules using a software component when the testing packet is the second testing packet type. In implementations, the at least one defined field is at least one of a communication protocol field, at least one field indicative of fragmentation, at least one field indicative of multiple fragments, or an Internet Protocol (IP) options field.

In general, a method for performing a Mapping of Address and Port using translation (MAP-T) data plane validation, the method including provisioning a network component with MAP-T testing rules, assembling a validation packet based on the MAP-T testing rules, sending the validation packet to a border router, translating the validation packet per provisioned MAP-T rules, transmitting the translated validation packet, compiling a report with characteristics and translation accuracy of the translated validation packet, and configuring at least one device based on a received report. In implementations, the assembling further including setting source and destination parameters to a common address, and setting an Internet Protocol (IP) format of the validation packet. In implementations, the assembling further including setting at least one parameter to form a packet type for the validation packet. In implementations, the translating further including checking the packet type of the validation packet, translating the validation packet per the provisioned MAP-T rules via an acceleration path when the validation packet is a first packet type, and translating the validation packet per the provisioned MAP-T rules via a non-acceleration path when the validation packet is a second packet type. In implementations, the at least one parameter is at least one of a communication protocol parameter, fragmentation parameter, multiple fragments parameter, or an Internet Protocol (IP) options parameter. In implementations, the IP format is one of an Internet Protocol Version 4 (IPv4) or an Internet Protocol Version 6 (IPv6).

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software packet, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for performing a Mapping of Address and Port using translation (MAP-T) data plane verification, the method comprising:
    sending, by a diagnostic server to a border relay provisioned with MAP-T rules, a diagnostic packet per MAP-T diagnostic rules provisioned on the diagnostic server, wherein the diagnostic packet is configured to test different components in the border relay;
    analyzing, by the diagnostic server to generate a report, at least a latency of a received MAP-T translated diagnostic packet from the border relay; and
    configuring at least one device based on a received report.

2. The method of claim 1, wherein the analyzing further comprising:
    analyzing at least a packet loss of a received MAP-T translated diagnostic packet from the border relay.

3. The method of claim 1, wherein the generating further comprising:
    setting, by the diagnostic server, a source address and a destination address in the diagnostic packet to an address of the diagnostic server.

4. The method of claim 1, wherein the diagnostic packet is one of an Internet Protocol Version 4 (IPv4) or an Internet Protocol Version 6 (IPv6) format.

5. The method of claim 1, wherein the generating further comprising:
    setting, by the diagnostic server, at least one defined field to differentiate between a first type diagnostic packet and a second type diagnostic packet.

6. The method of claim 5, wherein the first type diagnostic packet is associated with translation by the border relay via a first path.

7. The method of claim 6, wherein the second type diagnostic packet is associated with translation by the border relay via a second path.

8. The method of claim 5, wherein the at least one defined field is at least one of a communication protocol field, one or more fields indicative of fragmentation, one or more fields indicative of multiple fragments, or an Internet Protocol (IP) options field.

9. A system comprising:
    a network device provisioned with at least Mapping of Address and Port using translation (MAP-T) rules, the network device configured to translate a testing packet using the provisioned MAP-T rules;
    a management server configured to send configuration data to at least one device based on a testing packet report;
    a diagnostic server in contact with the network device and the management server, the diagnostic server provisioned with at least MAP-T diagnostic rules, wherein the diagnostic server is configured to:
        transmit the testing packet to the network device, wherein the testing packet is formed per the MAP-T diagnostic rules and is configured to test different components in the network device; and produce the testing packet report based on analyzed characteristics of a translated testing packet received from the network device, the analyzed characteristics including at least packet loss.

10. The system of claim 9, wherein the analyzed characteristics includes at least latency.

11. The system of claim 9, wherein the testing packet is one of an Internet Protocol Version 4 (IPv4) or an Internet Protocol Version 6 (IPv6) format.

12. The system of claim 9, wherein the diagnostic server is further configured to populate a source field and a destination field with an Internet Protocol (IP) address of the diagnostic server.

13. The system of claim 9, wherein the diagnostic server is further configured to populate one or more defined fields to establish one of a first testing packet type and a second testing packet type.

14. The system of claim 13, wherein the first testing packet type is associated with hardware based translation by the network device.

15. The system of claim 14, wherein the second testing packet type is associated with software based translation by the network device.

16. The system of claim 13, wherein the one or more defined fields is at least one of a communication protocol field, one or more fields indicative of fragmentation, one or more fields indicative of multiple fragments, or an Internet Protocol (IP) options field.

17. A method for performing a Mapping of Address and Port using translation (MAP-T) data plane validation, the method comprising:

sending a validation packet based on MAP-T testing rules to a border router, wherein the validation packet is formed based on the MAP-T testing rules and configured to test different components in a border router;

compiling a report with at least one of latency and packet loss characteristics of a MAP-T rules translated validation packet received from the border router; and configuring at least one device based on a received report.

18. The method of claim 17, wherein the report is compiled with both the latency and the packet loss characteristics.

19. The method of claim 17, wherein the sending further comprising:

setting at least one parameter to form a packet type for the validation packet.

20. The method of claim 19, wherein the at least one parameter differentiates between the border router translating the validation packet via an acceleration path and a non-acceleration path.

* * * * *